US012311669B2

(12) United States Patent
Sunouchi et al.

(10) Patent No.: US 12,311,669 B2
(45) Date of Patent: May 27, 2025

(54) RECORDING APPARATUS

(71) Applicant: CANON KABUSHIKI KAISHA, Tokyo (JP)

(72) Inventors: Shunya Sunouchi, Tokyo (JP); Masahito Yoshida, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 18/160,869

(22) Filed: Jan. 27, 2023

(65) Prior Publication Data

US 2023/0241895 A1 Aug. 3, 2023

(30) Foreign Application Priority Data

Feb. 3, 2022 (JP) ................................ 2022-015782
Dec. 2, 2022 (JP) ................................ 2022-193640

(51) Int. Cl.

| | |
|---|---|
| ***B41J 2/175*** | (2006.01) |
| ***B41J 2/165*** | (2006.01) |
| ***B41J 2/17*** | (2006.01) |
| ***B41J 25/00*** | (2006.01) |
| ***B41J 29/46*** | (2006.01) |

(52) U.S. Cl.

CPC ....... *B41J 2/17503* (2013.01); *B41J 2/16511* (2013.01); *B41J 2/16523* (2013.01); *B41J 2/1721* (2013.01); *B41J 25/001* (2013.01); *B41J 29/46* (2013.01); *B41J 2002/16582* (2013.01)

(58) Field of Classification Search

CPC ................ B41J 2/17503; B41J 2/16511; B41J 2/16523; B41J 2/1721; B41J 25/001; B41J 29/46; B41J 2002/16582; B41J 2/16508; B41J 2/16532; B41J 2/175; B41J 2/17509; B41J 2/17513; B41J 2/1752; B41J 2/17553; B41J 29/02; B41J 29/13; B41J 29/38

See application file for complete search history.

(56) References Cited

U.S. PATENT DOCUMENTS

2013/0100205 A1* 4/2013 Sunouchi ................ B41J 2/185
347/85

FOREIGN PATENT DOCUMENTS

| | | | |
|---|---|---|---|
| JP | H09240013 | A | 9/1997 |
| JP | 2007160825 | A | 6/2007 |
| JP | 2016088016 | A | 5/2016 |
| JP | 2021091185 | A | 6/2021 |

* cited by examiner

*Primary Examiner* — Lisa Solomon

(74) *Attorney, Agent, or Firm* — Canon U.S.A., Inc. I.P. Division

(57) ABSTRACT

A recording apparatus includes a liquid container configured to contain, outside a recording area of the recording apparatus, liquid to be supplied to a recording head configured to perform recording by discharging the liquid to a recording medium in the recording area, a maintenance unit disposed outside the recording area, including a suction unit configured to suck the liquid from the recording head, and configured to carry out maintenance of the recording head, and a liquid reservoir portion below the liquid container and the maintenance unit.

21 Claims, 7 Drawing Sheets

RECORDING APPARATUS

BACKGROUND

Field

The present disclosure generally relates to a recording apparatus.

Description of the Related Art

Some known recording apparatuses that perform recording by discharging ink from a recording head to a medium include a reservoir portion in which the ink to be supplied to the recording head is reserved and/or a maintenance unit that carries out maintenance of the recording head. In a case where the ink leaks out inside such an apparatus, it is necessary to take measures to prevent the ink from leaking out from the apparatus. Japanese Patent Application Laid-Open No. 2007-160825 discusses a configuration in which an ink absorber is disposed at a portion where ink leakage may occur inside the apparatus and an ink detection unit that detects absorption of ink by the ink absorber is provided.

In the configuration discussed in Japanese Patent Application Laid-Open No. 2007-160825, the ink leakage inside the apparatus is detected by detecting the ink absorbed by the ink absorber. Thus, it is supposed that it takes time to detect the ink leakage after the ink leakage occurs.

The present disclosure is directed to, in a case where ink leakage occurs inside a recording apparatus, reduction in time from the occurrence of the ink leakage to detection of the ink leakage.

SUMMARY

According to some embodiments, a recording apparatus includes a liquid container configured to contain, outside a recording area of the recording apparatus, liquid to be supplied to a recording head configured to perform recording by discharging the liquid to a recording medium in the recording area, a maintenance unit disposed outside the recording area, including a suction unit configured to suck the liquid from the recording head, and configured to carry out maintenance of the recording head, and a liquid reservoir portion below the liquid container and the maintenance unit.

Further features of the present disclosure will become apparent from the following description of exemplary embodiments with reference to the attached drawings.

DESCRIPTION OF THE EMBODIMENTS

Various exemplary embodiments, features, and aspects of the present disclosure are described in detail below with reference to the accompanying drawings.

A first exemplary embodiment of the present disclosure will be described below. Initially, an outline of an inkjet recording apparatus according to the present exemplary embodiment will be described.

<Outline of Recording Apparatus>

Figure 1:
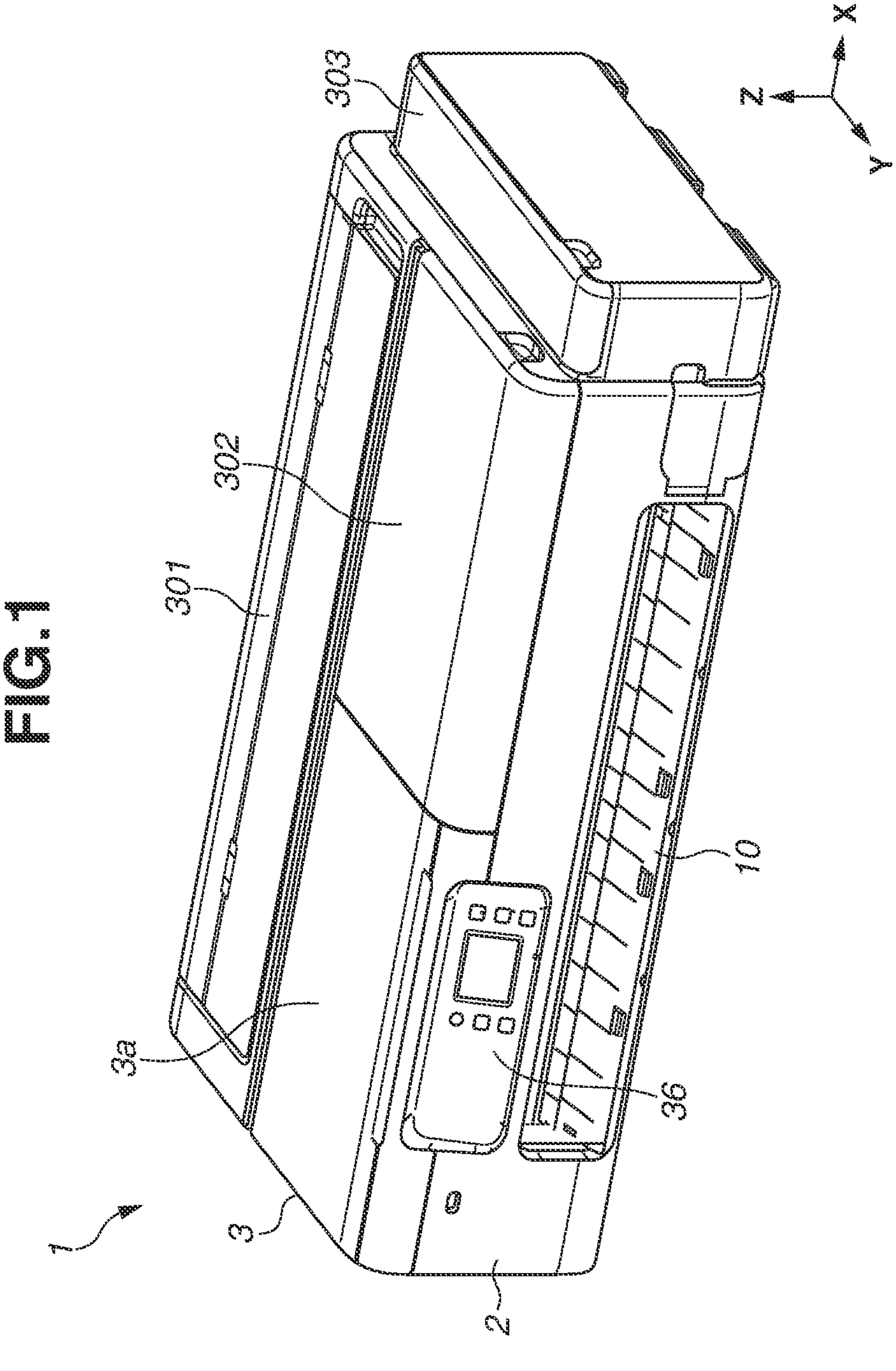
FIG. 1 is an appearance perspective view of a recording apparatus according to a first exemplary embodiment.

FIG. 1 is an appearance diagram of a recording apparatus 1 according to the present exemplary embodiment. The recording apparatus 1 according to the present exemplary embodiment is an inkjet recording apparatus that performs recording by discharging ink as liquid to a recording medium. In the present exemplary embodiment, sheet-like paper is assumed as the recording medium; however, the recording medium may be fabric, a plastic film, or the like. In drawings, arrows X and Y indicate horizontal directions perpendicularly intersecting each other, and an arrow Z indicates a vertical direction (gravity direction). The X direction is a width direction (right-left direction) of the recording apparatus 1. The Y direction is a depth direction of the recording apparatus 1.

The recording apparatus 1 has a flat rectangular-parallelepiped shape as a whole, and includes an apparatus main body 2 and a main body cover portion 3 including a plurality of covers. The main body cover portion 3 is provided to cover the apparatus main body 2, and forms a top portion of the recording apparatus 1. The main body cover portion 3 according to the present exemplary embodiment includes a sheet feeding cover 301 for setting the recording medium, an access cover 302 for performing a maintenance work inside the recording apparatus 1, and a tank access cover 303 covering a portion from which the ink is supplied to a tank of the apparatus.

A reading unit (scanner unit) 3*a* that reads an image of a document is provided, and the whole of the reading unit 3*a* is capable of performing opening movement in a manner similar to the access cover 302 to perform the maintenance work inside the apparatus. A discharge portion 10 to which the recorded recording medium is discharged is provided on a front part of the recording apparatus 1. An operation unit 36 that receives operation by an operator is provided on the front part of the recording apparatus 1. The operation unit 36 includes a display unit of a touch panel system, receives input operation by the operator, and displays information to the operator.

Figure 2:
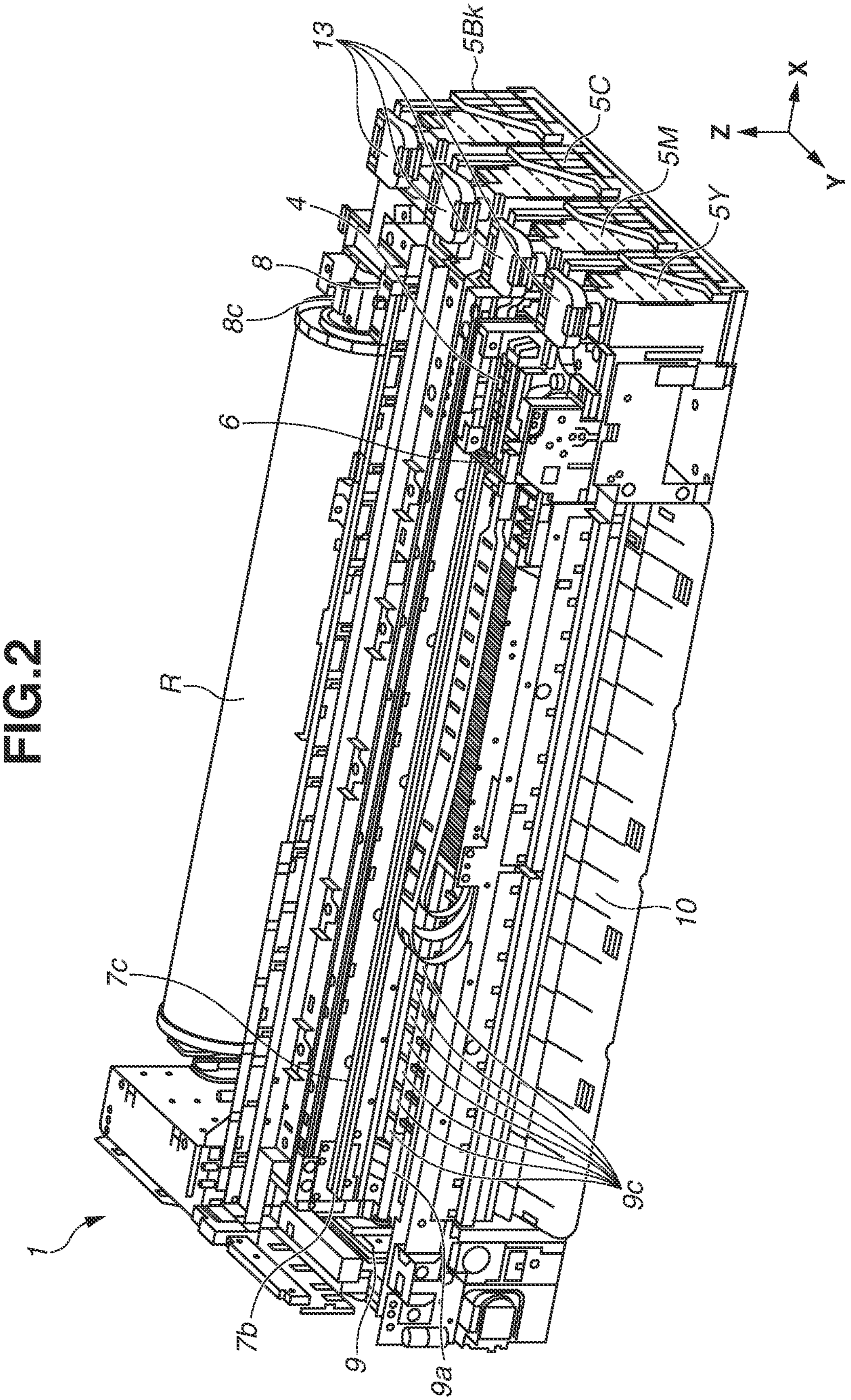
FIG. 2 is a perspective view illustrating an internal mechanism of the recording apparatus according to the first exemplary embodiment.

FIG. 2 is an explanatory diagram illustrating an internal mechanism of the recording apparatus 1. The recording apparatus 1 includes a recording head 4 that discharges ink. The recording head 4 according to the present exemplary embodiment performs recording by discharging the ink supplied from containers 5C, 5M, 5Y, 5Bk (hereinafter, also simply referred to as container(s) 5) as liquid containers, to the recording medium. The recording head 4 includes a discharge surface 4*a* (see FIG. 3B) including a plurality of nozzles (discharge portions) that discharges the ink. Each of the nozzles is provided with, for example, an electrothermal conversion element (heater). The electrothermal conversion elements heat and foam the ink by energization, and the forming energy cause the respective nozzles to discharge the ink.

The recording head 4 is mounted on a carriage 6, and is supported by a driving unit (not illustrated) such that reciprocate motion in the X direction (main scanning direction) is performable. The driving unit includes a driving pulley (not illustrated) and a driven pulley 7*b* that are spaced apart in the X direction, an endless belt 7*c* wound around these pulleys, and a carriage motor (not illustrated) that is a driving source to rotate the driving pulley. The carriage 6 is coupled to the endless belt 7*c*, and is moved in the X direction when the endless belt 7*c* runs. During the movement of the carriage 6, the ink is discharged from the recording head 4 to the recording medium, thus recording an image. An area where liquid is dischargeable to the recording medium is referred to as a recording area, and operation of moving the carriage 6 while the ink is being discharged from the recording head 4 in the recording area is referred to as record scanning.

As described above, the recording apparatus 1 according to the present exemplary embodiment is a serial inkjet recording apparatus in which the recording head 4 is mounted on the carriage 6 that reciprocates. However, the exemplary embodiment is also applicable to an inkjet recording apparatus including a full-line recording head that includes a plurality of nozzles configured to discharge liquid to an area corresponding to a width of a recording medium.

The recording apparatus 1 includes a feeding unit 8 and a conveyance unit 9 that convey the recording medium. The feeding unit 8 includes a roll set portion 8*c* that supplies a banner-like continuous recording medium R from a roll, and a feeding mechanism (not illustrated) for the recording medium. The feeding mechanism includes a feeding roller (not illustrated), and a feeding motor 8*b* (see FIG. 7) serving as a driving source that rotates the feeding roller.

The conveyance unit 9 is a mechanism for conveying the recording medium fed from the feeding unit 8, in the Y direction (sub-scanning direction). The conveyance unit 9 includes a conveyance roller 9*a*, and a conveyance motor 9*b* (see FIG. 7) serving as a driving source that rotates the conveyance roller 9*a*. Pinch rollers 9*c* come into pressure contact with the conveyance roller 9*a*, and the recording medium is clamped by nips of the conveyance roller 9*a* and the pinch rollers 9*c*. The recording medium is intermittently conveyed to the recording head 4 by rotation of the conveyance roller 9*a*. Recording operation is performed by alternately repeating conveyance operation of the recording medium by the conveyance unit 9 and the record scanning.

<Configurations of Ink Supply System and Waste Ink Collection System>

As illustrated in FIG. 2, in the present exemplary embodiment, the containers 5 are stationary containers fixed to the recording apparatus 1. In a case where an ink remaining amount is low, an operator replenishes ink in the containers 5 without detaching the containers 5 from the recording apparatus 1.

The containers 5C, 5M, 5Y, and 5Bk are provided corresponding to the number of ink colors to be stored, and are arranged in the Y direction along a right side surface of the recording apparatus 1. Upper parts of the containers 5C to 5Bk are covered with a common tank cover portion 13.

Figure 3A:
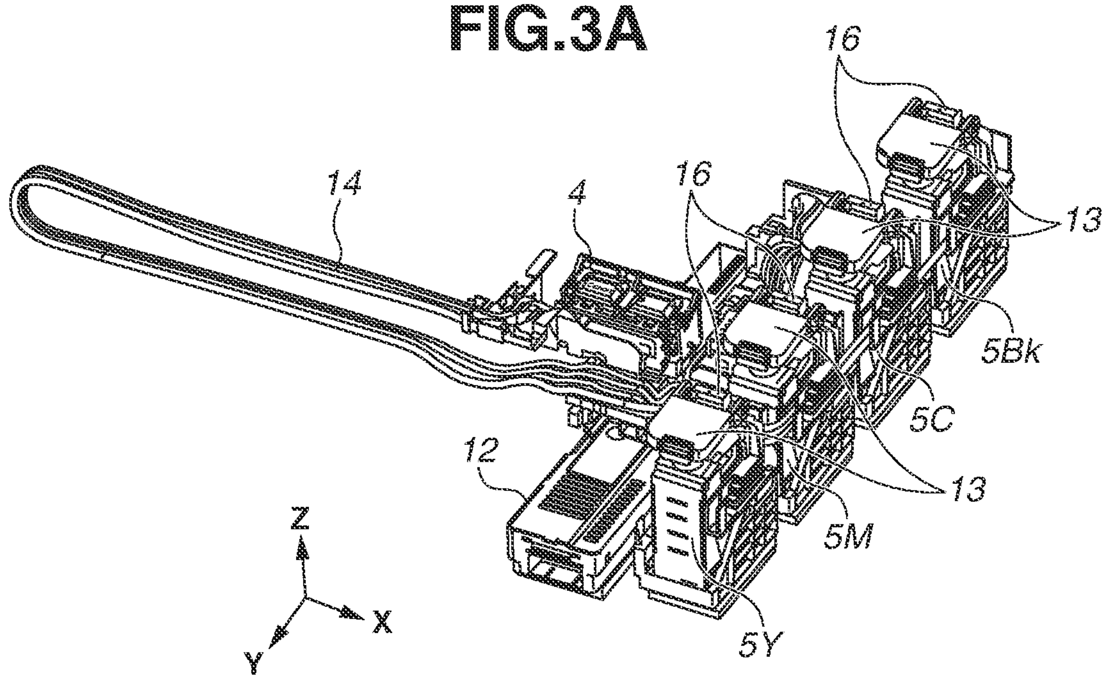
FIG. 3A is a schematic perspective view of configurations of containers and a periphery thereof according to the first exemplary embodiment.

FIG. 3A is a perspective view illustrating the containers 5C to 5Bk, valves 16, and the recording head 4 and the peripheral structure thereof. The containers 5C to 5Bk are connected to the recording head 4 by a supply tube 14.

Figure 3B:
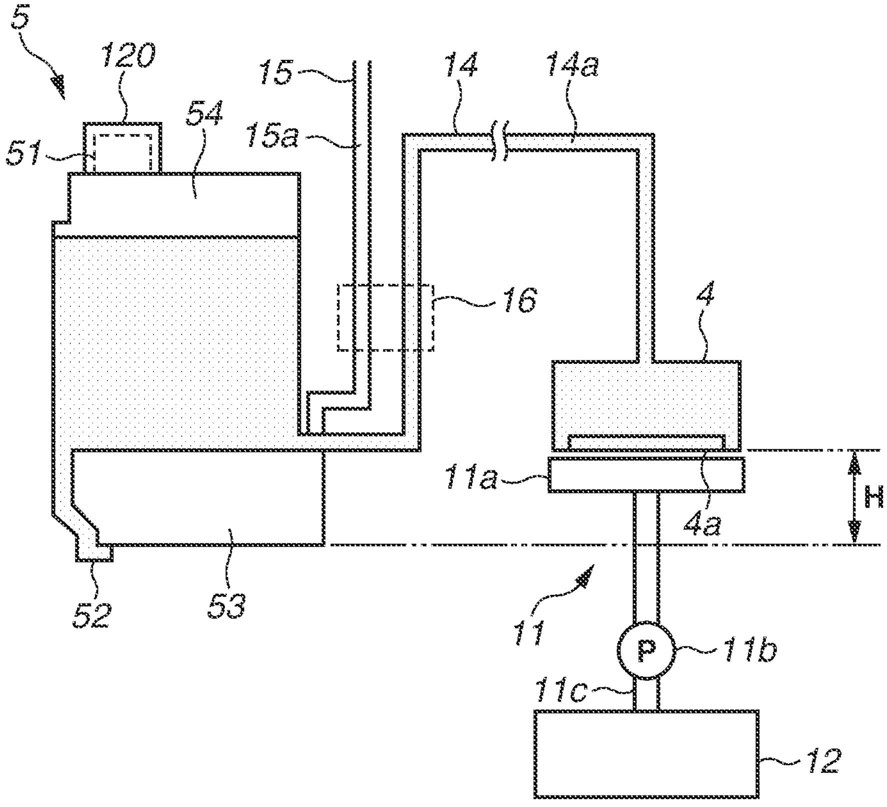
FIG. 3B is a schematic view of configurations of a container and a periphery thereof according to the first exemplary embodiment.

FIG. 3B schematically illustrates configurations of one container 5 and a periphery thereof. Each of the containers 5Y, 5M, 5C, and 5Bk basically has the configuration illustrated in FIG. 3B while a connection position of an ink flow path and a length of the supply tube 14 are different among the containers 5Y, 5M, 5C, and 5Bk. Each container 5 includes a storage portion 54 that stores ink, a gas-liquid exchange portion 52, and a buffer chamber 53. The buffer chamber 53 can store ink pushed out from the storage portion 54 when air inside the storage portion 54 is expanded due to pressure change, temperature change, or the like. An injection portion 51 for replenishing liquid (replenishing ink) is provided on an upper part of the container 5. The injection portion 51 is closed by a cap portion 120. To replenish ink, the operator detaches the cap portion 120 from the injection portion 51 and performs an ink replenishing work while the injection portion 51 is opened. The cap portion 120 is provided for each container 5.

Passages 14*a* and 15*a* communicate in the container 5. The passage 14*a* is a liquid supply path (ink supply path) that communicates with the storage portion 54 and supplies ink from the container 5 to the recording head 4. The passage 14*a* is formed of the supply tube 14 which is a flexible tube. The passage 15*a* is an air communication path that communicates with the buffer chamber 53 and makes the inside of the container 5 communicate with air. The passage 15*a* is formed of an air communication tube 15 which is a flexible tube. The valve 16 opens and closes the passages 14*a* and 15*a*. In the present exemplary embodiment, the dedicated valve 16 is provided in each of the containers 5C to 5Bk.

The gas-liquid exchange portion 52 is provided at a position lower by a height H than the discharge surface 4*a* of the recording head 4. In other words, a negative pressure caused by water head difference of the height H is applied to the discharge surface 4*a*. This makes it possible to prevent the ink from leaking out from the discharge surface 4*a*. The buffer chamber 53 is positioned at a lower part of the container 5. This makes it possible to prevent the ink from leaking out of the air communication path 15*a*.

A recovery unit 11 is a mechanism for maintaining ink discharge performance of the recording head 4, and is disposed at an end in a moving range of the carriage 6. The recovery unit 11 includes a cap 11*a* covering the discharge surface 4*a* of the recording head 4, a pump 11*b* for sucking the ink from the recording head 4 via the cap 11*a*, and the like. The cap 11*a* is displaceable to a position at which the cap 11*a* covers the discharge surface 4*a* and a position separated from the discharge surface 4*a*, by a mechanism (not illustrated). The discharge surface 4*a* is covered with the cap 11*a* (capping), thus preventing drying of the discharge surface 4*a*.

Sucking operation of operating the pump 11*b* is performed with the cap 11*a* capping the discharge surface 4*a*, thus enabling removal of thickened ink adhering to the recording head 4 and filling the passage 14*a* and the recording head 4 with the ink. When the recording operation is performed in a state where the passage 14*a* and the recording head 4 are filled with the ink, the ink is supplied from the container 5 by a reduction amount (discharge amount) of the ink from the recording head 4. In the present exemplary embodiment, a tube pump is used as the pump 11*b*; however, a component other than the tube pump may be used.

A waste ink collection tank 12 that collects the ink ejected or discharged from the discharge surface 4*a* is provided, and is connected to the pump 11*b* by a drain tube 11*c*. When the pump 11*b* is operated, the sucked ink is collected to the waste ink collection tank 12 through the drain tube 11*c*.

<Control Unit>

Figure 7:
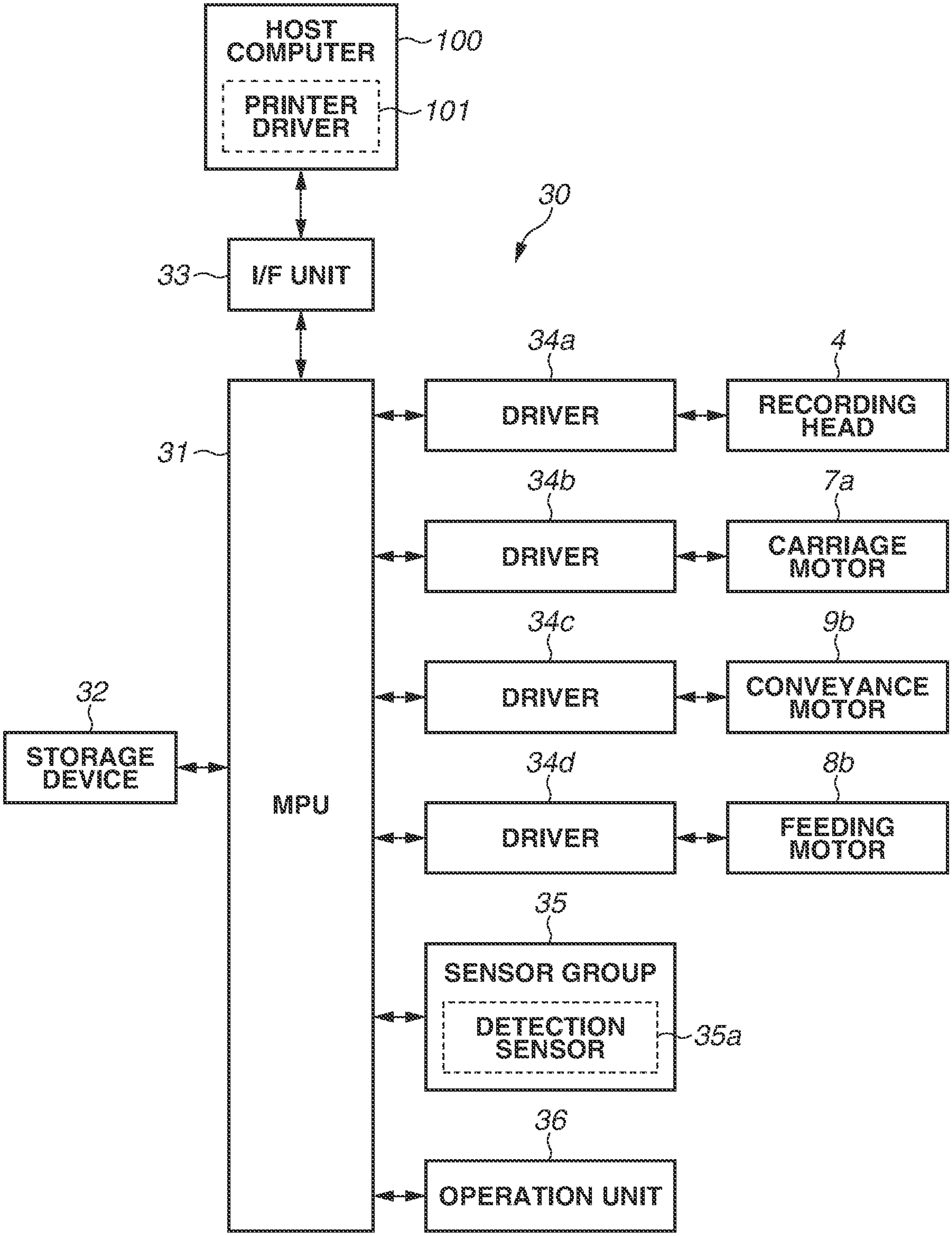
FIG. 7 is a block diagram of a control unit of the recording apparatus according to the first exemplary embodiment.

FIG. 7 is a block diagram illustrating a control unit 30 of the recording apparatus 1. A microprocessor unit (MPU) 31 includes one or more processors, circuitry, or combinations thereof that controls the operations of the recording apparatus 1, data processing, and the like. The MPU 31 controls the entire recording apparatus 1 by executing programs stored in a storage device 32. The storage device 32 includes, for example, a read only memory (ROM) and a random access memory (RAM). The storage device 32 stores various types of data to be used for processing, for example, data received from a host computer 100, in addition to the programs to be executed by the MPU 31.

The MPU 31 controls the recording head 4 via a driver 34*a*. The MPU 31 controls a carriage motor 7*a* via a driver 34*b*. The MPU 31 controls the conveyance motor 9*b* and the feeding motor 8*b* respectively via drivers 34*c* and 34*d*.

The MPU 31 performs control operation by acquiring a detection result of a sensor group 35 including various sensors provided in the recording apparatus 1. The sensor group 35 includes a detection sensor 35*a* described below. The MPU 31 performs display control of the display unit of the operation unit 36, and receives operation by the operator performed on the operation unit 36.

The host computer 100 is, for example, a personal computer or a mobile terminal (e.g., smartphone or tablet terminal) which is used by the operator. A printer driver 101 that performs communication between the host computer 100 and the recording apparatus 1 is installed in the host computer 100. The recording apparatus 1 includes an interface unit 33, and the communication between the host computer 100 and the MPU 31 is performed through the interface unit 33. For example, in a case where execution of the recording operation is input to the host computer 100 by the operator, the printer driver 101 collects data of an image to be recorded and setting relating to the recording (information such as quality of recorded image), and instructs the recording apparatus 1 to perform the recording operation. As used herein, the term "unit" generally refers to firmware, software, hardware, circuitry, or combinations thererof that is used to effectuate a purpose.

<Ink Leakage Detection Configuration>

In a case where, inside the recording apparatus 1, an accidental trouble, such as a failure at a connection portion (not illustrated) between the supply tube 14 and each of the containers 5, a failure at a connection portion between the drain tube 11*c* and the pump 11*b*, and a partial breakage of the containers 5 and the pump 11*b* occurs, ink leakage may occur. If the operator continuously uses the recording apparatus 1 with the ink leakage occurring, the ink may further leak from the inside to the outside of the apparatus. Thus, the leaking ink is to be retained in the apparatus. If the ink leakage is unaddressed, the ink continuously leaks out. Thus, a configuration for detecting the ink leakage is to be also provided. Here, an ink leakage detection configuration according to the present exemplary embodiment will be described with reference to FIGS. 4 to 6.

Figure 4:
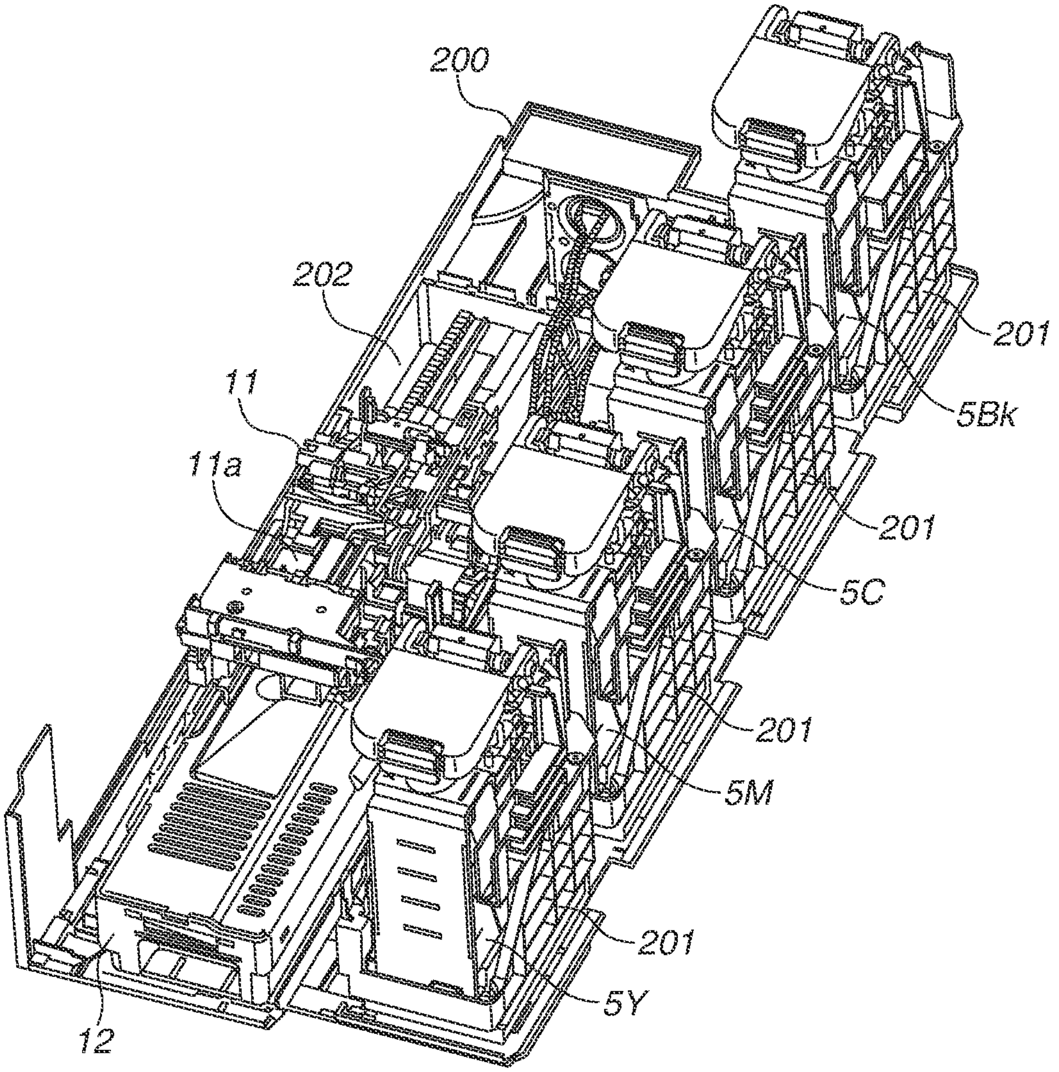
FIG. 4 is a perspective view of configurations of the containers and a recovery unit according to the first exemplary embodiment.

FIG. 4 is a perspective view of configurations of the containers 5 and the recovery unit 11. The recording apparatus 1 according to the present exemplary embodiment includes a leaking ink reservoir portion (liquid reservoir portion) 200 below the containers 5C, 5M, 5Y, and 5Bk and the recovery unit 11. The recording apparatus 1 includes the detection sensor 35*a* (see FIGS. 5A and 5B) that is a detection unit that detects leakage of the ink into the liquid reservoir portion. For example, a view window may be provided in the leaking ink reservoir portion 200 to allow the operator to visually check ink leakage, in addition to detection by the detection sensor 35*a*.

Figure 5A:
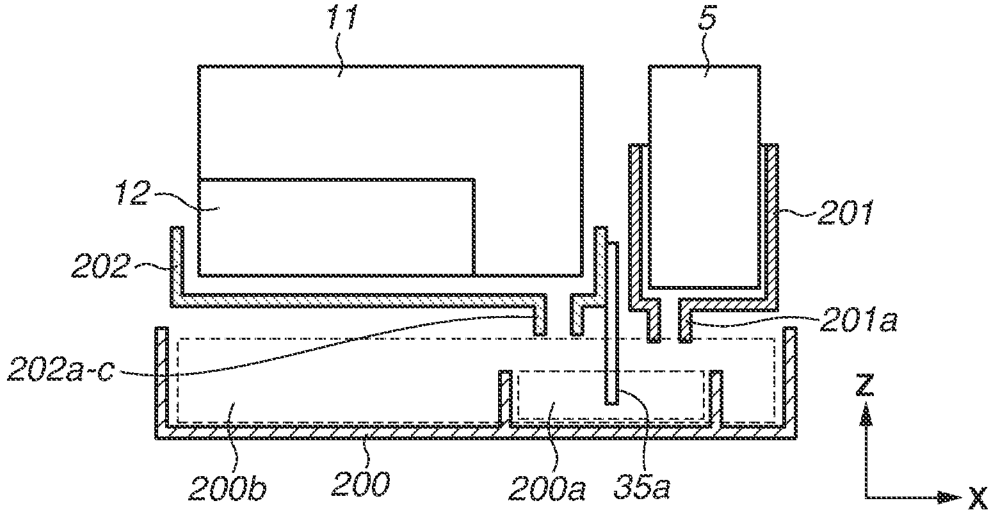
FIG. 5A is a schematic view of a periphery of a leaking ink reservoir portion according to the first exemplary embodiment as viewed from a Y direction.

FIG. 5A is a schematic view of the leaking ink reservoir portion and the periphery thereof as viewed from the Y direction. The leaking ink reservoir portion 200 is partitioned into a leaking ink reservoir chamber 200*a* and a leaking ink reservoir chamber 200*b* by a reservoir chamber side surface 210*a*. The detection sensor 35*a* detects the presence or absence of the ink in the leaking ink reservoir chamber 200*a* (in liquid reservoir chamber). The detection sensor 35*a* includes a pair of electrode terminals, and detects ink leakage based on a change in electric resistance caused by conduction of the electrode terminals due to the leaking ink. In the present exemplary embodiment, the detection sensor 35*a* is provided on a recovery unit holding case 202 described below, and is disposed such that an end part extends into the reservoir chamber 200*a*. The configuration of the detection sensor 35*a* is not limited to the above-described configuration, and the detection sensor 35*a* may have a configuration including a plurality of electrode terminals or the other configuration. The detection sensor 35*a* may be provided on each of container holding cases 201, or may extend into the reservoir chamber 200*a* from the other part.

Figure 5B:
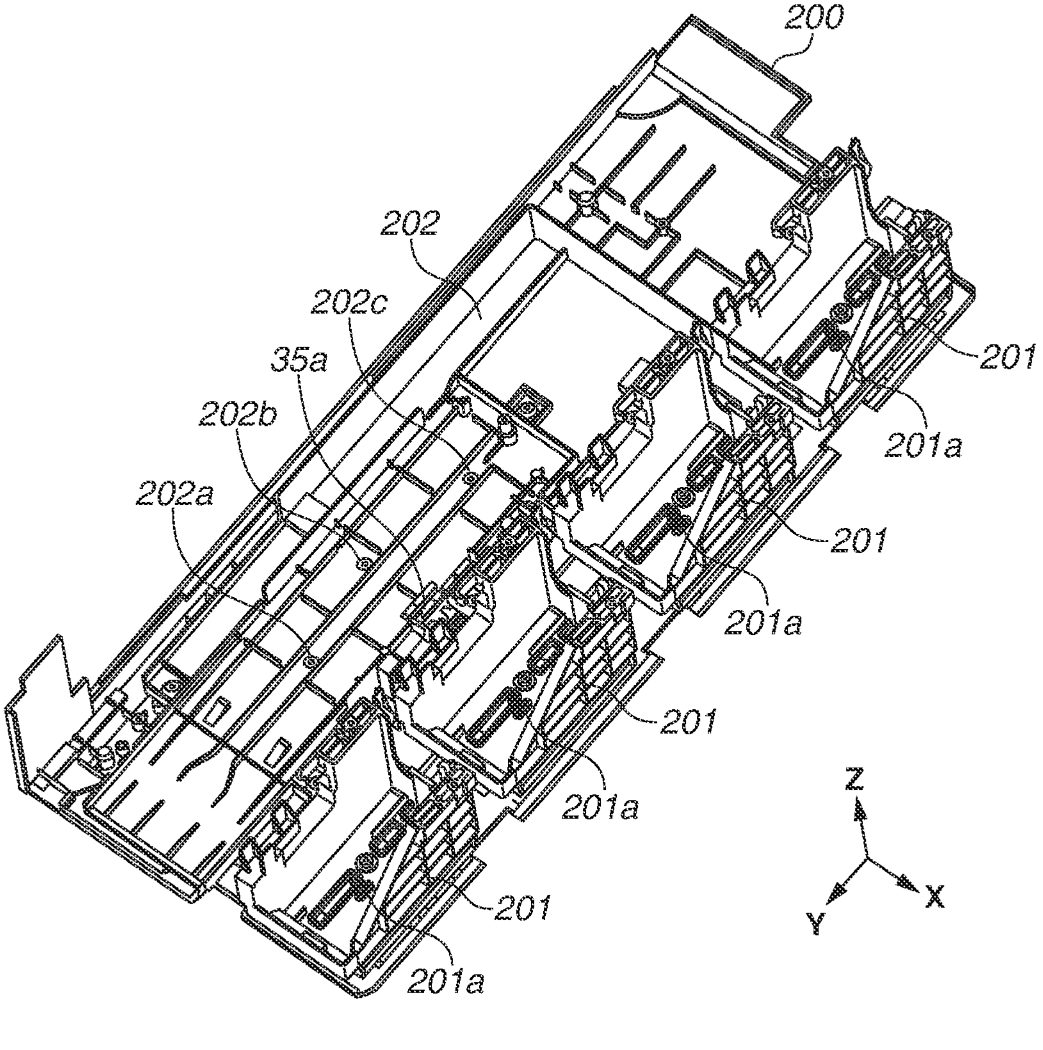
FIG. 5B is an appearance perspective view of container holding cases and a recovery unit holding case according to the first exemplary embodiment.

FIG. 5B is an appearance perspective view of the container holding cases 201 and the recovery unit holding case 202. The containers 5C, 5M, 5Y, and 5Bk are individually supported by the corresponding container holding case 201, which is a container supporting portion having a bucket shape, and are held at predetermined positions in the recording apparatus 1. The recovery unit 11 and the waste ink collection tank 12 are supported by the recovery unit holding case 202 (suction unit supporting portion) 202 having a bucket shape, and are held at predetermined positions in the recording apparatus 1.

Each of the container holding cases 201 includes an ink guide portion 201*a* at a position corresponding to the position of a corresponding one of the containers 5C, 5M, 5Y, and 5Bk, and the recovery unit holding case 202 includes ink guide portions 202*a*, 202*b*, and 202*c*. The ink guide portions 201*a*, 202*a*, 202*b*, and 202*c* are provided at positions facing the leaking ink reservoir chamber 200*a*. The number of ink guide portions provided in the recovery unit holding case 202 may not be three, and it is sufficient to provide one or more ink guide portions. The number of ink guide portions provided in each of the container holding cases 201 may be one or more.

In a case where the ink leaks out from any one or more of the containers 5C, 5M, 5Y, and 5Bk, the leaking ink initially flows to lower parts inside the container holding cases 201. The ink having reached the lower parts inside the container holding cases 201 further flows to the ink guide portions 201*a*, and the ink is guided so as to flow into the leaking ink reservoir chamber 200*a* by the ink guide portions 201*a*. Similarly, the ink leaking out from the recovery unit 11 and the waste ink collection tank 12 flows to a lower part of the recovery unit holding case 202, and the ink is guided so as to flow into the leaking ink reservoir chamber 200*a* by the ink guide portions 202*a* to 202*c*. In the present exemplary embodiment, the ink guide portions are thus provided near portions where ink leakage may occur, to guide the leaking ink to the leaking ink reservoir chamber 200*a* (first leaking ink reservoir chamber).

Inclination inclined to the ink guide portions may be provided at the lower part of each of the container holding cases 201 and/or the recovery unit holding case 202, thus facilitating the leaking ink easily reaching the ink guide portions.

As described above, the detection sensor 35*a* is disposed in the leaking ink reservoir chamber 200*a*, and the detection sensor 35*a* is disposed so that the end part of the detection sensor 35*a* is closer to a bottom surface of the leaking ink reservoir chamber 200*a* than the end part thereof is to an upper end part of the reservoir chamber side surface 210*a*. This enables the detection sensor 35*a* to detect the ink inside the leaking ink reservoir chamber 200*a* in a case where the ink flows into the leaking ink reservoir chamber 200*a*. To detect an inflow of the ink even in a case where a small amount of ink flows into the leaking ink reservoir chamber 200*a*, the detection sensor 35*a* is desirably disposed so that the end part thereof is close to the bottom surface of the leaking ink reservoir chamber 200*a*.

In a case where the amount of leaking ink flowing into the leaking ink reservoir chamber 200*a* exceeds an amount reservable in the leaking ink reservoir chamber 200*a*, the leaking ink overflows the reservoir chamber side surface 210*a* into the leaking ink reservoir chamber 200*b*, and is reserved in the leaking ink reservoir chamber 200*a*. Note that an ink outflow portion (liquid outflow portion) through which ink flows out from the leaking ink reservoir chamber 200*a* may be formed by lowering a height of a part of the reservoir chamber side surface 210*a*, thus controlling an ink inflow position to the leaking ink reservoir chamber 200*b*. The ink outflow portion is not limited to the configuration in which the height of a part of the reservoir chamber side surface 210*a* is changed, and may be formed by providing a hole portion.

Even in a case where ink leakage occurs in a state where the recording apparatus 1 is inclined, the ink is to be prevented from leaking out of the leaking ink reservoir portion 200. To do so, the ink is to be prevented from flowing out of a reservoir chamber side surface 210*b* surrounding the leaking ink reservoir chamber 200*b*. Thus, the reservoir chamber side surface 210*b* desirably has an upper end part at a position as high as possible. The reservoir chamber side surface 210*b* has the upper end part at a position higher than a lowest part of the upper end part of the reservoir chamber side surface 210*a*, thus preventing the ink that has overflowed the reservoir chamber side surface 210*a* and/or the ink outflow portion from further overflowing the reservoir chamber side surface 210*b* and flowing out of the apparatus.

Thus, the upper end part of the reservoir chamber side surface 210*b* is desirably located at a position higher than the upper end part of the reservoir chamber side surface 210*a*. In a case where the above-described ink outflow portion is provided in the reservoir chamber side surface 210*a*, the upper end part of the reservoir chamber side surface 210*b* is desirably located at a position higher than the ink outflow portion.

Figure 6:
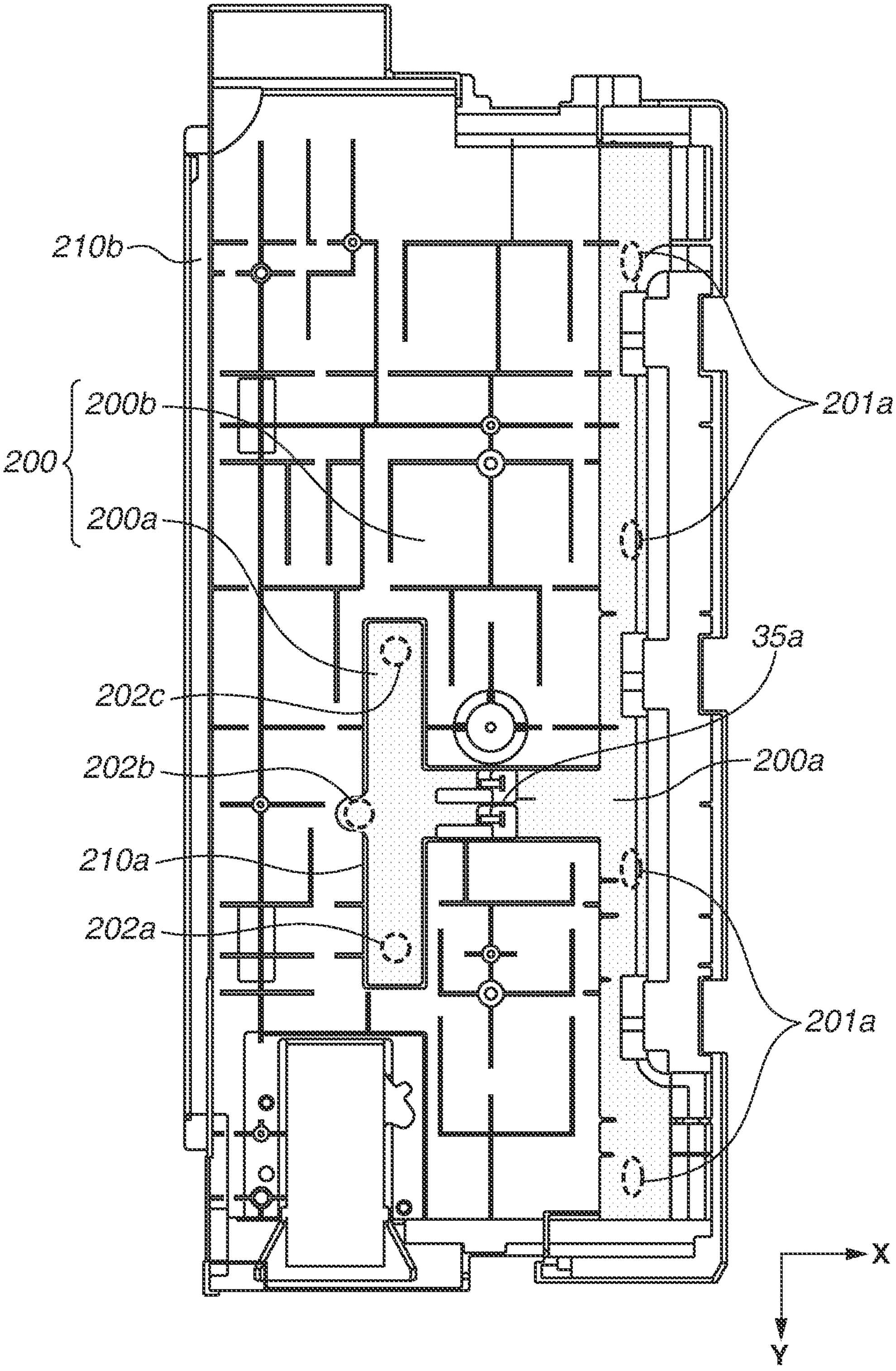
FIG. 6 is a schematic top view illustrating a configuration of the leaking ink reservoir portion according to the first exemplary embodiment.

FIG. 6 is a schematic top view illustrating the configuration of the leaking ink reservoir portion 200. In FIG. 6, the leaking ink reservoir chamber 200*a* is positioned at a portion painted in gray color, and the ink guide portions 201*a*, 202*a*, 202*b*, and 202*c* are positioned at portions illustrated by dashed-line circles. Further, the leaking ink reservoir chamber 200*b* is adjacent to the leaking ink reservoir chamber 200*a* with the reservoir chamber side surface 210*a* in between.

Even in a case where the leaking ink flows into the leaking ink reservoir chamber 200*a* from any of the ink guide portions, a time from ink inflow until detection of the ink leakage is desirably made equal among the ink guide portions in order to prevent extreme delay in detection of the ink leakage from one guide portion. To do so, distances from each of the ink guide portions 201*a*, 202*a*, 202*b*, and 202*c* to the detection sensor 35*a* are desirably made equal to one another. For example, in a case where a distance from the detection sensor 35*a* to one ink guide portion is denoted by D, a distance from the detection sensor 35*a* to another ink guide portion is preferably set to 98% to 102% of the distance D, depending on the configuration of each of the guide portions and the sensor.

On the other hand, in a case where it is difficult to make the distances from the detection sensor 35*a* to each of the ink guide portions substantially equal to one another, the detection sensor 35*a* is desirably disposed at a position at which difference in distance from the detection sensor 35*a* to each of the ink guide portions is minimum. This makes it possible to reduce a difference in time from inflow of the ink until detection of ink leakage even in a case where the ink flows into the leaking ink reservoir chamber 200*a* from any of the ink guide portions. Further, making the ink amount reservable in the leaking ink reservoir chamber 200*a* small enables the detection sensor 35*a* to early detect the occurrence of the ink leakage even through the leaking amount is small. Thus, it is desirable to reduce the ink amount reservable in the leaking ink reservoir chamber 200*a* as much as possible. Note that a plurality of detection sensors 35*a* may be arranged to early detect the ink that has flowed in from each of the ink guide portions.

The ink leakage inside the recording apparatus occurs due to the above-described factors. In particular, if the suction operation by the pump 11*b* is continued in a state where the ink leakage occurs near the pump 11*b* during the suction operation, an amount of leaking ink increases. In the present exemplary embodiment, in a case where the pump 11*b* is operating at the time when the detection sensor 35*a* detects ink leakage, the recording apparatus 1 stops the suction operation of the pump 11*b*. This prevents increase of the leaking ink, thus preventing damage caused by the ink leakage.

In a case where the ink leakage occurs from the connection portion between any of the containers 5 and the supply tube 14, stopping the recording operation enables prevention of further ink leakage. Thus, in the case where the ink leakage is detected during the recording operation by the recording head 4, the recording apparatus 1 may stop the recording operation.

In contrast, in a case where the ink leakage occurs from any of the containers 5 due to, for example, breakage of that container 5, even when the pump 11*b* is stopped or the recording operation is stopped as described above, the ink leakage is continued because of the water head difference of the ink inside the containers 5. Thus, to reserve the leaking ink in the recording apparatus 1 even in the case where the ink leakage occurs due to breakage of any of the containers 5, the leaking ink reservoir portion 200 desirably has a capacity enough to reserve an ink amount containable in one container 5 or more. In the present exemplary embodiment, although the leaking ink reservoir chamber 200*a* has a small capacity, the leaking ink reservoir chamber 200*b* has a large capacity to secure a sufficient capacity as the leaking ink reservoir portion 200. The leaking ink reservoir chamber 200*b* may include a plurality of reservoir chambers.

With the above-described configuration, the ink leakage is detected by the detection sensor 35*a* when the ink leakage occurs inside the recording apparatus 1. A result of the detection may be notified to the operator through a notification unit of the host computer 100, the operation unit 36, or the like. The notification by the notification unit may be performed using sound, light, screen display by a display unit, such as a display, vibration, and the like. The ink leakage is notified to the operator by such a unit or units, and the recording apparatus 1 stops the recording operation and the pump 11*b*, which makes it possible to prevent increase of the leaking ink. After the notification to the operator, the operation of the recording apparatus 1 may be limited in order to prevent restart of the recording operation by the operator and the suction operation of the pump 11*b*.

As described above, since the leaking ink is guided from the ink guide portions to the leaking ink reservoir chamber 200*a*, so that the leaking ink is collected to one portion, irrespective of an ink leakage occurrence position. This enables the detection sensor 35*a* to detect the ink leakage. Further, since the capacity of the leaking ink reservoir chamber 200*a* is small, the time after the ink leakage occurs inside the recording apparatus until the ink leakage is detected can be reduced. This makes it possible to detect the ink leakage early.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-015782, filed Feb. 3, 2022, and No. 2022-193640, filed Dec. 2, 2022, which are hereby incorporated by reference herein in their entirety.

What is claimed is:

1. A recording apparatus comprising:

a liquid container configured to contain, outside a recording area of the recording apparatus, liquid to be supplied to a recording head configured to perform recording by discharging the liquid to a recording medium in the recording area;

a maintenance unit disposed outside the recording area, including a suction unit configured to suck the liquid from the recording head, and configured to carry out maintenance of the recording head;

a liquid reservoir portion below the liquid container and the maintenance unit;

a first flow path configured to guide the liquid having leaked from the liquid container, to the liquid reservoir portion; and a second flow path configured to guide the liquid having leaked from the maintenance unit, to the liquid reservoir portion.

2. The recording apparatus according to claim 1, wherein the first flow path is formed by a first opening facing a bottom part of the liquid container and a second opening facing the liquid reservoir portion, and wherein the second flow path is formed by a third opening facing a bottom part of the maintenance unit and a fourth opening facing the liquid reservoir portion.

3. The recording apparatus according to claim 1, wherein the liquid container and the maintenance unit are adjacent to each other.

4. The recording apparatus according to claim 1, further comprising a detection unit configured to detect presence or absence of the liquid in the liquid reservoir portion.

5. The recording apparatus according to claim 4, wherein the recording apparatus includes a plurality of the liquid containers, wherein the recording head is movable in a first direction and a second direction opposite to the first direction, in the recording area, and wherein the liquid containers are arranged in a third direction intersecting both of the first direction and the second direction.

6. The recording apparatus according to claim 5, wherein a plurality of the first flow paths is disposed in one-to-one correspondence with the plurality of liquid containers.

7. The recording apparatus according to claim 6, wherein the detection unit is disposed at a position at which difference in distance from the detection unit to each of a plurality of the first flow paths is minimum.

8. The recording apparatus according to claim 6, wherein distances from the detection unit to each of a plurality of the first flow paths are substantially equal to one another.

9. The recording apparatus according to claim 6, wherein the detection unit is disposed at a position at which a difference between a distance from the detection unit to the first flow path and a distance from the detection unit to the second flow path is minimum.

10. The recording apparatus according to claim 6, wherein a distance from the detection unit to the first flow path and a distance from the detection unit to the second flow path are substantially equal to each other.

11. The recording apparatus according to claim 6, wherein, in a case where the detection unit detects presence of the liquid in the liquid reservoir portion, discharge of the liquid by the recording head is stopped.

12. The recording apparatus according to claim 6, wherein the maintenance unit performs maintenance operation of sucking the liquid from the recording head using the suction unit, and in a case where the detection unit detects presence of the liquid in the liquid reservoir portion during the maintenance operation, the maintenance unit stops the maintenance operation.

13. The recording apparatus according to claim 1, further comprising a second liquid reservoir portion adjacent to the liquid reservoir portion with a wall portion in between.

14. The recording apparatus according to claim 13, wherein the wall portion includes a liquid guide portion, and wherein the liquid guide portion guides the liquid from the liquid reservoir portion to the second liquid reservoir portion.

15. The recording apparatus according to claim 13, wherein the second liquid reservoir portion is surrounded by a second wall portion, and wherein the second wall portion has an upper end at a position higher than an upper end of the wall portion.

16. The recording apparatus according to claim 14, wherein the second liquid reservoir portion is surrounded by a second wall portion, and wherein the second wall portion has an upper end at a position higher than the liquid guide portion.

17. The recording apparatus according to claim 13, wherein an amount of liquid reservable in the second liquid reservoir portion is greater than an amount of liquid reservable in the liquid reservoir portion.

18. The recording apparatus according to claim 13, wherein an amount of liquid reservable in the liquid reservoir portion and the second liquid reservoir portion is greater than or equal to an amount of liquid containable in the liquid container.

19. The recording apparatus according to claim 4, further comprising a notification unit configured to notify, in a case where the detection unit detects presence of the liquid in the liquid reservoir portion, an operator of leakage of the liquid.

20. A recording apparatus comprising:

a liquid container configured to contain, outside a recording area of the recording apparatus, liquid to be supplied to a recording head configured to perform recording by discharging the liquid to a recording medium in the recording area;

a maintenance unit disposed outside the recording area, including a suction unit configured to suck the liquid from the recording head, and configured to carry out maintenance of the recording head; and a liquid reservoir portion below the liquid container and the maintenance unit, wherein the liquid container and the maintenance unit are adjacent to each other.

21. A recording apparatus comprising:

a liquid container configured to contain, outside a recording area of the recording apparatus, liquid to be supplied to a recording head configured to perform recording by discharging the liquid to a recording medium in the recording area;

a maintenance unit disposed outside the recording area, including a suction unit configured to suck the liquid from the recording head, and configured to carry out maintenance of the recording head;

a liquid reservoir portion below the liquid container and the maintenance unit; and a waste liquid tank configured to collect the liquid sucked by the suction unit.

* * * * *